United States Patent
Maxwell et al.

(10) Patent No.: US 7,646,670 B2
(45) Date of Patent: Jan. 12, 2010

(54) AUTONOMOUS OCEAN BOTTOM SEISMIC NODE RECORDING DEVICE

(75) Inventors: Peter W. Maxwell, Missouri City, TX (US); Timothy R. E. Owen, Suffolk (GB); Stuart Denny, Houston, TX (US); Tor Haugland, Houston, TX (US); Joshua Ronen, Orinda, CA (US)

(73) Assignee: CGGVeritas Services (U.S.) Inc., Houston, TX (US)

( * ) Notice: Subject to any disclaimer, the term of this patent is extended or adjusted under 35 U.S.C. 154(b) by 0 days.

(21) Appl. No.: 11/851,997

(22) Filed: Sep. 7, 2007

(65) Prior Publication Data
US 2008/0080318 A1   Apr. 3, 2008

Related U.S. Application Data

(60) Provisional application No. 60/827,393, filed on Sep. 28, 2006.

(51) Int. Cl.
*G01V 1/38* (2006.01)
*G01V 1/16* (2006.01)

(52) U.S. Cl. .................... 367/15; 367/188; 181/122
(58) Field of Classification Search ............ 367/15, 367/178, 188; 181/122
See application file for complete search history.

(56) References Cited

U.S. PATENT DOCUMENTS

| 5,022,012 | A | 6/1991 | Godfrey et al. | |
|---|---|---|---|---|
| 6,932,185 | B2 | 8/2005 | Bary et al. | |
| 7,324,406 | B2 * | 1/2008 | Berg | 367/15 |
| 2003/0174580 | A1 | 9/2003 | Rioux | |
| 2005/0270901 | A1 | 12/2005 | Swanson | |
| 2005/0276162 | A1 * | 12/2005 | Brinkmann et al. | 367/77 |
| 2006/0120216 | A1 | 6/2006 | Ray et al. | |
| 2006/0131099 | A1 | 6/2006 | Meynier et al. | |

FOREIGN PATENT DOCUMENTS

WO   WO 2004/031807 A1 *   4/2004

OTHER PUBLICATIONS

Beaudoin et al., "The Atlantis OBS Project: OBS Nodes-Defining the Need, Selecting the Technology,. and Demonstrating the Solution", presentation at the 2006 Offshore Technology Conference held in Houston, Texas, U.S.A., May 1-4, 2006, 9 pages.

Duhram, "Node Patch Takes Bottom Readings", AAPG Explorer, Mar. 29, 2006, online http://www.fairfield.com/Services/Data%20Acquisition/Related%20Articles/Node%20Patch%20Takes%20Bottom%20Readings.pdf.

Fairfield, "Data Acquisition: Z System; Reducing the size of its seismic crews while increasing their efficiency", online <http://www.fairfield.com/Services/Data%20Acquisition/Z%20System/>.

(Continued)

*Primary Examiner*—Ian J Lobo
(74) *Attorney, Agent, or Firm*—Fulbright & Jaworski, L.L.P.

(57) ABSTRACT

The present invention relates to an improved autonomous node seismic recording device having an integrated modular design and one or more features that assist coupling of the unit to the sea floor in order to improve the vector fidelity of seismic signal measurement.

23 Claims, 3 Drawing Sheets

OTHER PUBLICATIONS

Fischer, "Interest surges in seafloor node seismic systems", WorldOil Magazin, archive, Sep. 2004, vol. 225 (9), online <http://www.worldoil.com/magazine/MAGAZINE_DETAIL.asp?ART_ID=2385&MONTH_YEAR=Sep-2004>.

Mitchell et al., "The Atlantis OBS Project: Developing and Building the OBS Node Technology", presentation at the 2006 Offshore Technology Conference held in Houston, Texas, U.S.A., May 1-4, 2006, 7 pages.

Mitchell, "A New 'Node' Of Acquisition", E&P, Nov. 2005, 2 pages, vol. 83.

International Search Report issued Mar. 10, 2008 during the prosecution of International Application No. PCT/US07/77897.

Written Opinion issued Mar. 10, 2008, during the prosecution of International Application No. PCT/US07/77897.

International Preliminary Report on Patentability issued Mar. 31, 2009 (Published Mar. 31, 2009), during the prosecution of International Application No. PCT/US2007/077897.

* cited by examiner

AUTONOMOUS OCEAN BOTTOM SEISMIC NODE RECORDING DEVICE

CROSS-REFERENCE TO RELATED APPLICATIONS

This application claims priority to U.S. provisional application Ser. No. 60/827,393 filed on Sep. 28, 2006.

TECHNICAL FIELD

The present invention relates to the field of marine seismic sensing. In particular, the invention relates to a new autonomous ocean bottom seismic node recording device.

BACKGROUND OF THE INVENTION

Conventional streamer systems or ocean bottom cable systems have been the traditional ocean seismic imaging systems. However, these systems ordinarily record narrow azimuth data. Complex geological formations such as the salt bodies of the Gulf of Mexico have resulted in the need of more sophisticated subsurface images.

A current solution is the use of all azimuth illumination and data acquisition. One example of all azimuth data acquisition uses autonomous ocean bottom nodes. Nodes are independent seismometers. In the typical application, they are battery-powered with precise clocks for time synchronization. In operation, the nodes remain on the seafloor for an extended period of time for the recording of acoustic waves coming from a source vessel at the surface and returning energy from formations below the sea bed. Ocean Bottom Seismometers (OBS) are used for the recording of seismic data on the sea-floor. They are self contained recording stations comprising, geophone and hydrophone sensors, recording unit, and reference clock and power source. They are intended for long term autonomous acquisition for up to 6 months. Data are accessed after recovery of the units. OBS nodes can be used for passive seismic monitoring or for recording seismic energy generated by acoustic sources. The latter method can be used for oil and gas exploration or for production monitoring. They are retrieved, at which time, the data are downloaded and batteries may be replaced or recharged ready for the next deployment.

The inventors have developed an improved autonomous ocean bottom node seismic recording device having an integrated modular design and one or more features that assist coupling of the unit to the sea floor and improve the azimuthal fidelity of seismic signal measurement (vector fidelity).

BRIEF SUMMARY OF THE INVENTION

In one aspect of the present invention, there is an autonomous ocean bottom seismic node recording device comprising: an integrated modular housing, a base plate forming the bottom of the housing; a battery and recording unit housing assembly comprising: a signal recording unit housing mounted on the base plate, the recording unit housing having a size and shape to house a recording unit; and, at least one battery housing mounted on the base plate, the battery housing having a size and shape to house a battery; wherein the battery and recording unit housing assembly is arranged symmetrically with respect to the base plate; and, a vector sensor housing mounted on or through the base plate, the vector sensor housing comprising at least one vector sensor, the vector sensor housing mounted coaxially with the base plate.

In some embodiments, the at least one battery housing comprises two battery housings, and the recording unit housing and the two battery housings are arranged in a triangular fashion mutually at 120 degrees around the center of the base plate.

In some embodiments, the recording device has a center of mass within 10 mm of the axis of the base plate.

In some embodiments, the recording device has a center of mass within about 100 mm above the lower surface of the base plate.

In some embodiments, the recording device has a center of mass between approximately 20-50 mm above the lower surface of the base plate.

In some embodiments, the housing of the recording device comprises a cover component. In some embodiments having a cover component, the cover component comprises a hole positioned to allow ready access to the signal recording unit housing. In some embodiments having a cover component, the cover component comprises a hole to allow water to flood the interior of the autonomous ocean bottom seismic node recording device.

In some embodiments of the recording device, the base plate is circular.

In some embodiments of the recording device, the base plate has a diameter of about 600 mm.

In some embodiments of the recording device, the base plate includes a connector mounted to the base plate.

In some embodiments of the recording device, the base plate comprises grooves and/or holes on its underside.

In some embodiments the recording device further comprises a top plate.

In some embodiments of the recording device having a top plate, the base plate and the top plate are connected such that the battery housings are clamped in place.

In some embodiments of the recording device having a top plate, the top plate is mounted to the base plate through one or more support components.

In some embodiments of the recording device having a top plate mounted to the base plate through one or more support components, one or more support components comprise three support components. In some embodiments, wherein one or more support components comprise three support components, the three support components are three metal bars.

In some embodiments of the recording device, the recording device further comprises a cover, the cover in contact with the top plate, the base plate, or both the top plate and the base plate.

In some embodiments of the recording device, the recording device further comprises at least one hydrophone mounted externally to the vector sensor housing in communication with the recording unit.

In some embodiments of the recording device, the recording device further comprises cooperating structures on the top plate and the base plate.

In some embodiments of the recording device comprising cooperating structures on the top plate and the base plate, the cooperating structures on the top plate and the base plate comprises one or more raised segments and recessed sections.

In some embodiments of the recording device has a bearing load on the sea bottom of from about 50 Pa to about 200 Pa.

In some embodiments of the recording device has a bearing load on the sea bottom of from about 100 Pa to about 120 Pa.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
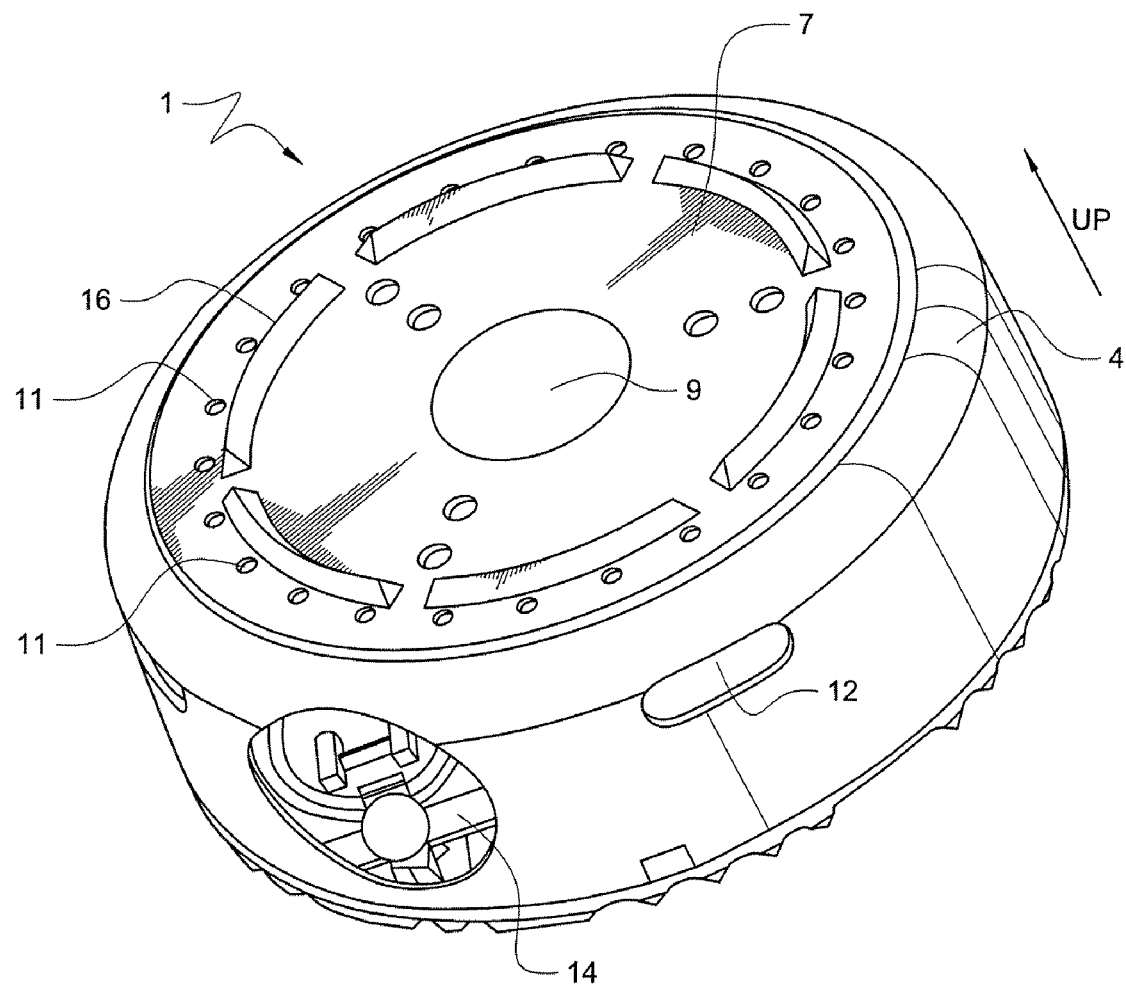
FIG. 1 shows a top view of an embodiment of the device of the present invention.

As used herein, "a" or "an" means one or more. Unless otherwise indicated, the singular contains the plural and the plural contains the singular.

The autonomous ocean bottom seismic node recording device of the present invention uses an integrated modular design. The bottom of the unit comprises a rigid base plate to which most of the components of the device are rigidly mounted. The device comprises a battery and recording unit housing assembly having a signal recording unit housing mounted on the base plate, the recording unit housing having a size and shape to house a recording unit; and at least one battery housing mounted on the base plate, the battery housing having a size and shape to house a battery. The battery and recording unit housing assemblies are arranged symmetrically with respect to each other and the base plate. The recording device comprises a vector sensor housing mounted on or through the base plate, the vector sensor housing comprising at least one vector sensor, the vector sensor housing mounted coaxially with the base plate. The recording device may have other features as well. In a preferred embodiment, there are two battery housings, and the recording unit housing and two battery housings are arranged in a triangular fashion mutually at 120 degrees, around the center of the base plate. Examples of other symmetric arrangements are, one recording unit and one battery mounted mutually parallel, one recording unit and 3 batteries forming the sides of a square, one recording unit and four batteries forming the sides of a pentagon, etc. Other symmetric arrangements, known or obvious to one of ordinary skill in the art are also applicable and part of the present invention. The vector sensor housing comprises at least one vector sensor, with the vector sensor housing mounted coaxially with the base plate. The vector sensor used in the device may be, for example, one or more of, a geophone, a piezoelectric accelerometer, a capacitive accelerometer, a MEMS accelerometer, a hydrophone accelerometer, etc. The vector sensor housing, recording unit housing, and battery unit housing are independently pressure-sealed vessels. Another embodiment is one in which the recording unit has a size and shape small enough such that the vector sensor housing and recording unit housing can be combined into a single housing containing both vector sensor(s) and recording unit with externally mounted hydrophone(s), mounted coaxially with the baseplate.

Each of these components is mounted to the base plate. The base plate is preferably circular in geometry. In some embodiments, the housing of the recording device has a cover component. Preferably, the recording device comprises a top plate. A top plate may provide the ceiling of the compartment that houses the components. A cover component can be positioned between the base plate and the top plate to provide the side wall of the compartment that houses the components. A cover may also be provided to avoid the snagging of the interconnect cables. In preferred embodiments, the top plate is mounted to one or more support components mounted on the base plate. An example of such a support component is a bar (such as a metal bar) or column that is mounted on the base plate and extends to the top plate. Ideally, there is more than one support component, preferably there are three.

The cover and/or top plate contains holes through which water is allowed to flood the internal structure of the unit. This provides acoustic coupling for the hydrophone(s). The underside of the base plate preferably has a grooved form to allow the channeling away of liquid mud during the deployment process, to provide improved coupling to the sea floor. In preferred configurations, connecting the base plate and the top plate result in the battery housings being clamped in place.

The top plate preferably comprises handling means to allow handling of the device in water and in air. Handling means includes, but is not limited to, a protruding handle, ring or hook, a rope or wire sling, a flat surface suitable for a suction device, and other devices known to those of ordinary skill in the art. The handling means may cooperate with a handling device, such as, but not limited to, a winch system, a remotely operating vehicle (ROV) manipulator, a suction device attached to an ROV, a remotely triggered pop-up buoy system. One of ordinary skill in the art would immediately recognize other means equally suited for this purpose and therefore also applicable in the present invention. In this way, the device may be grasped, held, transported, released, etc., in water and in air. In preferred configuration, the upper central surface of the top plate is essentially smooth for the contact of a suction manipulator and optionally may contain a raised lip to assist in centering the manipulator allowing handling of the units by remotely operated vehicles (ROVs). In some embodiments, the handling means consists of a flat surface forming at least a part of the top plate, such that a suction handling device can be used to pick up, hold, carry and release the recording device, in water and in air.

Also in preferred embodiments, the device further comprises communication means, preferably mounted to the top plate. The communication means allow remote communication with the recording device. Examples of such communication means, include, but are not limited to, optical means, acoustic means, inductive means, etc. One of ordinary skill in the art would immediately recognize other means equally suited for this purpose and therefore also applicable in the present invention.

The vector sensor housing preferably contains three geophone sensors rigidly mounted in an orthogonal arrangement. In the preferred configuration each geophone lies at an angle of 54.7 degrees to vertical. One or more hydrophones may also be mounted externally to the geophone housing, and exposed to the water which is allowed to flood the inside of the cover. The geophone housing is mounted coaxially with the circular base plate and extends through a circular hole in the base plate. Preferably, one recorder and two battery tubes are arranged symmetrically around the base plate.

Preferably, in the center of the top plate there is a coil through which a communications link can be established to the surface/support boat via the suction handler and ROV umbilical system. In such cases, this inductive communications link is used during deployment and retrieval of the OBS units for clock synchronization and unit configuration and testing.

In preferred embodiments, there is a waterproof electrical connector mounted on the base plate which is in contact with the recording unit housing. This connector is used to connect signals from the vector sensor housing, the coil and power from the battery(ies) to the recorder unit housing.

The device has one or more holes to allow water to flood the interior structure of the device, although a number of components in the device are pressure sealed to prevent water entry or an increase in pressure. While in preferred embodiments one or more holes are located on the top plate for this purpose, it is possible to additionally, or alternatively, have one or more holes in other areas, such as in the cover component.

The mechanical layout is designed for azimuthal symmetry, such that when the device is equipped for operation with a recording unit and battery, the center of mass of the whole unit is closely coaxial with the axis of the base plate. In a preferred embodiment, the center of mass of the recording device is within 10 mm of the axis of the base plate. The mechanical layout is also designed such that the center of mass (in air, fresh water or sea water) of the recording device is as close as possible to the under surface of the base plate. One embodiment maintains the center of mass within approximately 100 mm above the lower surface of the base plate. These features assist unit to sea floor coupling and improve the azimuthal fidelity of seismic signal measurement (vector fidelity). The device, when equipped for operation, has a center of mass which is concentric with the vertical axis of the vector sensor housing and nearer to the base plate than to the top plate. In this way, the device exhibits an improved stability and coupling to the ocean bottom for better recording. In another specific embodiment, the center of mass is approximately 50 mm above the lower surface of the base plate, more preferably between approximately 20-50 mm above the lower surface of the base plate. A circular base plate is preferred for stability, although other configurations are possible. Preferably, the base plate is circular and has a diameter of about 600 mm. Although the configuration described herein provides excellent stability for devices having any weight, in one embodiment, the device weighs about 59 kg. In the preferred embodiment, the bearing load of the device on the sea bottom (pressure exerted) is approximately 50 to 200 Pa. Most preferably, the bearing load of the device on the sea bottom (pressure exerted) is approximately 100 to 120 Pa.

During basic operations, the device comprises a recording unit in the signal recording unit housing. The recording unit will have at least one signal input in communication with the vector sensor; and at least one signal input in communication with the hydrophone. The vector sensor and the hydrophone provide the basic signals of the seismic measurement to the recording unit which records the data. In preferred embodiments, the recording unit comprises one hydrophone signal input and three geophone signal inputs, and also one or more auxiliary signal inputs. These auxiliary signal inputs can be used to provide the recording unit signals from auxiliary devices. Examples of such auxiliary devices include, but are not limited to, (i) a 2-3 axis inclinometer to measure tilt of the base plate relative to vertical, (ii) a compass measuring azimuth of the base plate (indexing a reference relative to magnetic north), (iii) a sea water thermometer, (iv) a seawater salinity measuring device, and (v) additional vector sensor(s) such as hydrophone accelerometers. Other auxiliary devices known to those of skill in that art, as well as those not yet developed may find application in the present invention and are therefore encompassed by the invention.

In preferred embodiments, the base plate may comprise grooves or holes or both grooves and holes to allow water and/or liquid mud to be expelled during deployment in water. Such grooves and/or holes act as conduits to effect the expulsion of water and/or liquid mud from the underside of the base plate during deployment. As the base plate is pushed into the mud the liquids are squeezed out of the grooves or holes thus avoiding water and/or liquid mud being trapped under the base plate that could detrimentally affect sea bed to base plate coupling.

In some embodiments, the recorder tube is removable through a hole in the side of the cover while the autonomous ocean bottom seismic node recording device is out of the water. This feature allows downloading of the recorded data and testing of the recording unit. Contact is made to the internal wiring of the OBS unit via a multi-pole waterproof connector mounted to end of the recorder tube and a mating connector mounted on a support flange attached to the base plate. Said connector additionally allows access to the signals from the vector sensor housing, the coil and power from the battery(s) for test purposes while the recorder tube is removed and the autonomous ocean bottom seismic node recording device is out of the water.

Although the pressure rating of the component parts may vary according to the application, preferably the parts are pressure rated for operation up to 6000 m of seawater. All parts are anodized to minimize corrosion during long term exposure to seawater. Sacrificial anodes and surface coating are optional for increased corrosion protection. In a preferred embodiment, some or all of the housing components and other components are made of anodized and passivated aluminum alloy. This allows for extended exposure of the device to sea water. Recording endurance time is aided by long life batteries and large data storage capacity of the recorder. An endurance time of 90 days or greater is preferred.

FIG. 1 provides an illustrative schematic of an embodiment of the instant device 1, showing the cover 4 and top plate 7 and a housing 9 which in preferred embodiments contains a communications coil (not shown). Holes 11, 12, allow water to flood the interior structure of the device during operation. In the embodiment of FIG. 1, there is provided an access hole 14, to access the recording unit without dismantling the device. Also shown in the embodiment of FIG. 1, are raised segments 16 on top plate 7. Raised segments 16 cooperate with corresponding recessed sections on the base plate as illustrated in FIG. 2 (not visible in FIG. 1).

Figure 2:
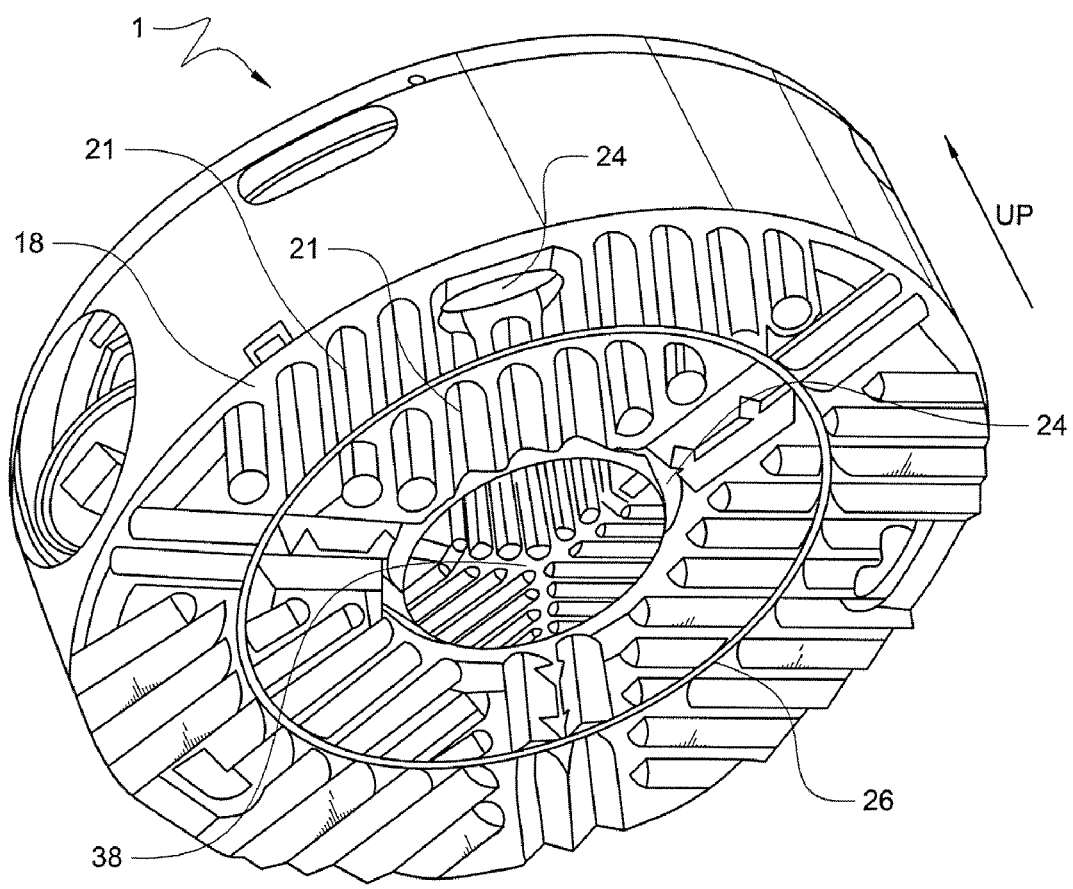
FIG. 2 shows a bottom view of an embodiment of the device of the present invention.

FIG. 2 illustrates an embodiment of the base plate 18 of device 1. In this embodiment, base plate 18 comprises grooves 21 and holes 24 which help to channel water from underneath the device. This results in improved mechanical and acoustic coupling between the device and the ocean bottom resulting in improved seismic data quality. Also shown in the embodiment of FIG. 2, is a recessed segment 26 on base plate 18. Recessed segment 26 cooperates with raised segments 16 of top plate 7. Cooperation of raised segments 16 of one device with recessed section 26 of another device allows secure stacking of multiple devices during transport. Although the illustrated embodiment uses raised segments on the top plate and recessed section on the base plate, it should be understood that the raised segments could be on the base plate and the recessed section could be on the top plate. Alternatively, cooperating structures of other geometries and configuration may be used on the top plate and base plate to facilitate stacking and transport. Also shown in FIG. 2 is the base of the vector sensor housing 38, here extending through the base plate, also comprising a grooved under surface matching the grooves in the base plate.

Figure 3:
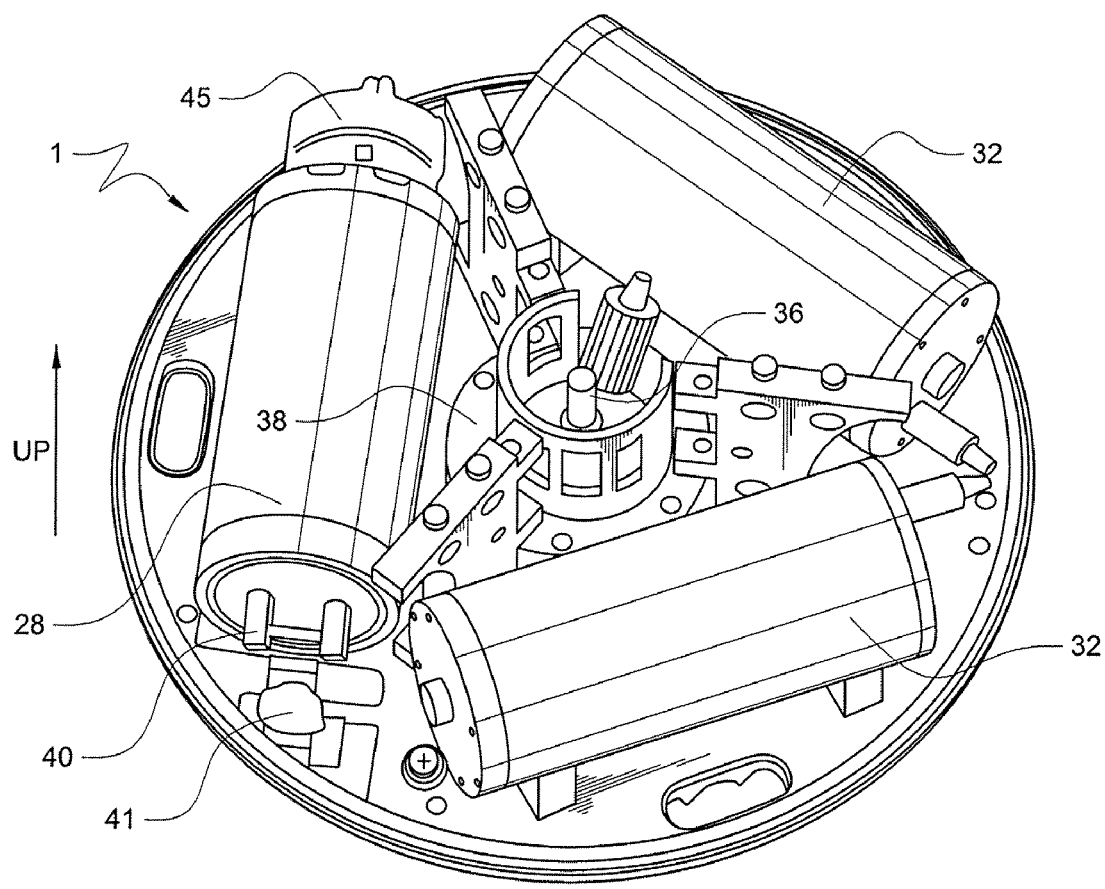
FIG. 3 shows an exposed view of the interior of an embodiment of the device of the present invention.

FIG. 3 illustrates an embodiment of the inside of the device 1 showing the signal recording unit housing 28 and two battery housings 32. A hydrophone 36 is positioned in the center of the vector sensor housing 38; geophones, although present, are not visible. Also shown in FIG. 3 is a handle 40 which allows for removal of the recording unit from the device, clamp 41, which allows for securing of the recording unit when installed in the device and fixed connector 45, located at the rear of the signal recording unit housing, to allow for a communication connection between the recording unit and other components of the device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the composition of matter, and methods described in the specification. As one of ordinary skill in the art will readily appreciate from the disclosure of the present invention, compositions of matter, methods, or steps, presently existing or later to be developed that perform substantially the same function or achieve substantially the same result as the corresponding embodiments described herein may be utilized according to the present invention. Accordingly, the appended claims are intended to include within their scope such processes, compositions of matter, methods, or steps.

What is claimed is:

1. An autonomous ocean bottom seismic node recording device comprising:
an integrated modular housing,
a base plate forming the bottom of said housing;
a battery and recording unit housing assembly comprising:
a recording unit housing mounted on said base plate, said recording unit housing having a size and shape to house a recording unit; and,
at least one battery housing mounted on said base plate, said battery housing having a size and shape to house a battery;
wherein said battery housing and recording unit housing are arranged symmetrically with respect to the base plate;
and,
a vector sensor housing mounted on or through said base plate, said vector sensor housing comprising at least one vector sensor, said vector sensor housing mounted coaxially with said base plate.

2. The recording device of claim 1, wherein said at least one battery housing comprises two battery housings, and said recording unit housing and said two battery housings are arranged in a triangular fashion mutually at 120 degrees around the center of the base plate.

3. The recording device of claim 1, having a center of mass within 10 mm of the axis of the base plate.

4. The recording device of claim 3, having a center of mass within about 100 mm above the lower surface of the base plate.

5. The recording device of claim 3 having a center of mass between approximately 20-50 mm above the lower surface of the base plate.

6. The recording device of claim 1, wherein said housing comprises a cover component.

7. The recording device of claim 6, wherein said cover component comprises a hole positioned to allow ready access to said signal recording unit housing.

8. The recording device of claim 6, wherein said cover component comprises a hole to allow water to flood the interior of said autonomous ocean bottom seismic node recording device.

9. The recording device of claim 1, wherein said base plate is circular.

10. The recording device of claim 1, wherein said base plate has a diameter of about 600 mm.

11. The recording device of claim 1, wherein said base plate includes a connector mounted to said base plate.

12. The recording device of claim 1, wherein said base plate comprises grooves and/or holes on its underside.

13. The recording device of claim 1, further comprising a top plate.

14. The recording device of claim 13, wherein said base plate and said top plate are connected such that the battery housings are clamped in place.

15. The recording device of claim 13, wherein said top plate is mounted to said base plate through one or more support components.

16. The recording device of claim 15, wherein said one or more support components comprise three support components.

17. The recording device of claim 16, wherein said three support components are three metal bars.

18. The recording device of claim 1, further comprising a cover, said cover in contact with said top plate, said base plate, or both said top plate and said base plate.

19. The recording device of claim 1, further comprising at least one hydrophone mounted externally to the said vector sensor housing in communication with said recording unit.

20. The recording device of claim 1, further comprising cooperating structures on said top plate and said base plate.

21. The recording device of claim 20, wherein said cooperating structures on said top plate and said base plate comprises one or more raised segments and recessed sections.

22. The recording device of claim 1, having a bearing load on the sea bottom of from about 50 Pa to about 200 Pa.

23. The recording device of claim 22, having a bearing load on the sea bottom of from about 100 Pa to about 120 Pa.

* * * * *